United States Patent [19]
Pifferi

[11] 3,862,138
[45] Jan. 21, 1975

[54] HETEROCYCLIC THIOAMIDES OF 4-SUBSTITUTED SYRINGIC ACID AND THEIR PREPARATION

[75] Inventor: Giorgio Pifferi, Milan, Italy
[73] Assignee: I.S.F.S.P.A., Milan, Italy
[22] Filed: Feb. 1, 1973
[21] Appl. No.: 328,693

Related U.S. Application Data
[62] Division of Ser. No. 93,460, Nov. 27, 1970, Pat. No. 3,755,317.

[30] Foreign Application Priority Data
July 31, 1970 Italy.................................. 28164/70

[52] U.S. Cl. ... 260/243 B, 260/244 R, 260/306.7 R, 260/307 F
[51] Int. Cl.. C07d 93/10, C07d 91/16, C07d 85/08
[58] Field of Search...... 260/306.7 R, 307 F, 243 B, 260/244 R, 551 S, 559 R

[56] References Cited
UNITED STATES PATENTS
3,432,549   3/1969   Kasitreiner...................... 260/559 R OTHER PUBLICATIONS
Reid, Organic Chemistry of Bivalent Sulfur, Vol. IV, Chemical Publishing Co., New York, 1962, pp. 50 & 48.
Wagner et al., Synthetic Organic Chemistry, John Wiley & Sons, New York, 1953, p. 827.

Primary Examiner—Richard J. Gallagher
Attorney, Agent, or Firm—Flynn & Frishauf

[57] ABSTRACT

Heterocyclic thioamides of 4-substituted syringic acid, and methods of their preparation, are described. The compounds have prolonged ataraxic or tranquilizing action upon the central nervous system.

5 Claims, No Drawings

HETEROCYCLIC THIOAMIDES OF 4-SUBSTITUTED SYRINGIC ACID AND THEIR PREPARATION

RELATED APPLICATION

This application is a division of application Ser. No. 93,460, filed Nov. 27, 1970, now U.S. Pat. No. 3,755,317.

The present invention concerns new thioamides of 4-substituted syringic acid having activity on the central nervous system and the methods for their preparation. According to one of its aspects the invention comprises, more in particular, the derivatives of the formula:

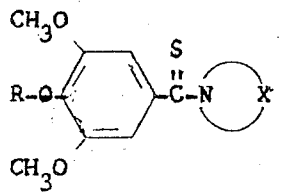

wherein R = $CH_3-$, $C_2H_5-$, $CH_3CO-$ or $C_2H_5OCO-$, and

represents the residue of a saturated secondary heterocyclic base having 4, 5, 6 or 7 atoms in the ring, wherein X represents $-CH_2-$, $-O-$, $-S-$ or $-NH-$. Examples of heterocyclic bases from which the

groups preferred in the thioamides of present invention may be derived are: pyrrolidine, 1,3-thiazolidine, imidazolidine, 1,2-oxazolidine, 1,3-oxazolidine, piperidine, piperazine, tetra-hydro-1,2-oxazine, tetra-hydro-1,3-oxazine, tetra-hydro-1, 1,4-oxazine, (morpholine), tetra-hydro-1,4-thiazane, perhydroazepine.

According to another aspect of the invention the herein described new thiamides can be used in therapy being endowed with a prolonged ataraxic or tranquilizing action upon the central nervous system without compromising the reflexes and the motorial coordination. Furthermore they show a very low toxicity, a favorable therapeutic coefficient, and the absence of collateral effects on the circle.

The new thioamides of the invention are characterized with respect to the corresponding amides in that they have a more prolonged effect. Although not wishing to bound the present invention to any theory, it can be supposed that this prolonged effect is to be put in relation with the greater resistance to hydrolysis which the thioamidic bond presents compared with the amidic bond.

The new compounds of the present invention can be prepared prevailingly according to one of the following synthesis methods:

1. An excess of a suitable 4-substituted syringic aldehyde is warm reacted with sulphur and a secondary heterocyclic based in the Willgeroth reaction conditions according to the following scheme:

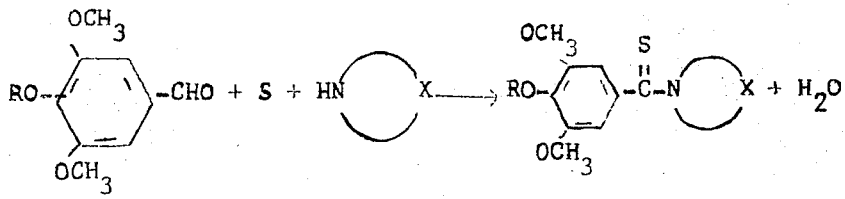

2. A second synthesis method consists in treating suitable tertiary amides of 4-substituted syringic acid with an excess of phosphorus pentasulphide according to the following scheme:

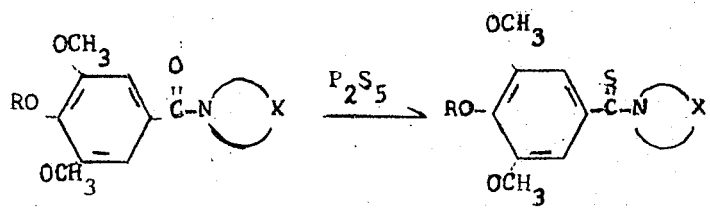

The sulphuration reaction is effected in an organic solvent, such as pyridine, at a temperature of from 70° C to 150°C, preferably by heating to 100°C and maintaining at this temperature for some hours.

3. A third variant considers the condensation of the thiobenzoic acid chloride, suitably substituted in the positions 3,4,5, with an excess of a secondary heterocyclic base according to the following scheme:

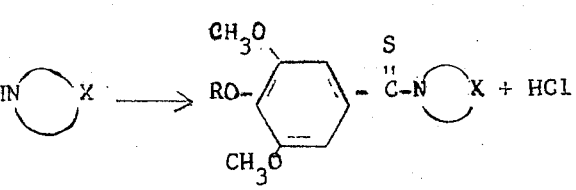

The invention will now be illustrated in detail as to its preparative aspect by the following examples which should not be considered as having any limitative character.

EXAMPLE 1

4-(3,4,5-trimethoxythiobenzoyl)-tetrahydro-1,4-oxazine

A mixture of 3g. 3,4,5-trimethoxybenzaldehyde, 0.53 g. of precipitated sulphur and 0.95 g. of morpholine was heated at 140°C for 75 minutes. It was then cooled to room temperature and the residue was crystallized from ethanol giving a very good yield of the desired product, m.p. 138°–140°C. Infrared spectrum (Nujol): 1,580 and 1,500 (benzene ring stretching), 1,110 (tetrahydro-1,4-oxazine) and 850 cm$^{-1}$ (aromatic $\gamma$ CH).

Analysis:

| Calculated for $C_{14}H_{19}NO_4S$: | C 56.55; | H 6.44; | N 4.71; | S 10.78 |
|---|---|---|---|---|
| Found: | C 56.42; | H 6.70; | N 4.84; | S 11.10 |

EXAMPLE 2

4-(3,4,5-trimethoxythiobenzoyl)-tetrahydro-1,4-thiazane

A mixture of 4.1 g. 3,4,5-trimethoxybenzaldehyde, 0.72 g. precipitated sulphur and 1.57 g. tetrahydro-1,4-thiazane was heated to 140°C and kept at this temperature for 1½ hours. The raw residue was then treated as in example 1, giving a very good yield of the desired product, m.p. 163°–165°C. Infrared spectrum (Nujol): 1,580 and 1,490 (benzene ring stretching), 1,125 (C—O) and 845 cm$^{-1}$ (aromatic $\gamma$ CH).

Analysis:

| Calculated for $C_{14}H_{19}NO_3S_2$: | C 53.63; | H 6.11; | N 4.47; | S 20.45 |
|---|---|---|---|---|
| Found: | C 53.26; | H 6.20; | N 4.36; | S 20.90 |

EXAMPLE 3

3-(3,4,5-trimethoxythiobenzoyl)-1,3-thiazolidine

A mixture of 5g. 3-(3,4,5-trimethoxybenzoyl)-1,3-thiazolidine and 4 g. phosphorus pentasulphide in 50 ml. anhydrous pyridine was heated under stirring to 100°C and kept at this temperature for 6 hours. It was then cooled, poured into diluted hydrochloric acid solution, extracted with chloroform, and the organic extracts were washed with a diluted sodium carbonate solution and then with water. After drying on sodium sulfate the solvent was distilled off and the residue was crystallized from isopropyl ether-ethanol 95:5. The desired product was obtained in a very good yield, m.p. 132°–134°C. Infrared spectrum (Nujol): 1,590 and 1,500 (benzene ring stretching), 1,125 (C—O ether) and 832 (aromatic $\gamma$ CH).

Analysis:

| Calculated for $C_{13}H_{17}NO_3S_2$: | C 52.17; | H 5.72; | N 4.68; | S 21.40 |
|---|---|---|---|---|
| Found: | C 52.33; | H 5.77; | N 4.60; | S 21.23 |

EXAMPLE 4

2-(3,4,5-trimethoxythiobenzoyl)-1,2-oxazolidine

A mixture of 17 g. 2-(3,4,5-trimethoxybenzoyl)-1,2-oxazolidine, and 14 g. phosphorus pentasulphide in 150 ml. anhydrous pyridine was heated to 100°C and kept under stirring at this temperature for 5 hours. It was cooled, poured into a diluted solution of hydrochloric acid and extracted three times with chloroform. The organic extracts were gathered and washed with a diluted solution of sodium carbonate, then with water and finally dried on sodium sulphate. The solvent was distilled off and the residue was subjected twice to chromatography on a disactivated silicagel column by eluting with chloroform-methanol 95:5. The unitary central fractions, after control on a plate (Rf = 0.46) were extracted with methanol and the solvent was evaporated. The residue was crystallized twice from methanol to give a good yield of the desired product, m.p. 105°–107°C. Infrared spectrum (Nujol): 1,590 and 1,500 (benzene ring stretching), 1,120 (C—O ether—and 850 cm$^{-1}$ (aromatic $\gamma$ CH).

Analysis:

| Calculated for $C_{13}H_{17}NO_4S$: | C 55.10; | H 6.05; | N 4.94; | S 11.31 |
|---|---|---|---|---|
| Found: | C 54.85; | H 6.04; | N 4.97; | S 11.66 |

EXAMPLE 5

4-(4-acetoxy-3,5-dimethoxythiobenzoyl)-tetrahydro-1,4-thiazane

A mixture of 1 g. 4'-(4-acetoxy-3,5-dimethoxybenzoyl)-tetrahydro-1,4-thiazane, 0.82 g. phosphorus pentasulphide and 10 ml. anhydrous pyridine was heated under stirring to 100°C and kept at this temperature for 5 hours, then cooled and poured into an excess of 10% hydrochloric acid. The mixture was repeatedly extracted with chloroform, the gathered extracts were washed with a diluted solution of $Na_2CO_3$, then with water and then they were dried on sodium sulfate. The solvent was distilled off and the residue was crystallized from ethanol and ethyl acetate. The desired product was obtained in good yields, m.p. 222°–224°C. infrared spectrum (Nujol): 1,760 (C = O ester), 1,600 and 1,500 (benzene ring stretching), 1135 (C—O) and 850 cm$^{-1}$ (aromatic $\gamma$ CH).

Analysis:

| Calculated for $C_{15}H_{19}NO_4S_2$: | C 52.69; | H 5.61; | N 4.10; | S 18.77 |
|---|---|---|---|---|
| Found: | C 52.50; | H 5.70; | N 4.00; | S 19.01 |

The following tests were employed for the evaluation of the neuropsychic activity of the compounds of the invention on the animal: behavior screening in the mouse according to Irwin (Gordon Res. Conf. Med. Chem. New London, N.H. - 1959), spontaneous motility in the mouse (Dunham and Mija - Am. Pharm. Assoc.; Sci. Ed. 46, 208, 1957), motorial coordination in the mouse, conditioned reflexes in the rat according to the Cook and Weidley method (Annals N.Y. Accad. Sci. 66, 740, 1957) modified by Mafii (j. Pharm. Pharmac., 11, 129, 1959). These methods are briefly described in the following.

The behavior screening in the mouse consists in the systematic observation of groups of three mice per dose treated with standardized doses (10 – 30 – 60 – 100 – 300 – 1,000 mg/kg i.p.) of the test pharmaceuticals. The psychosedative, neurosedative, neurovegetative, miorelaxing activities and the acute toxicity were observed and evaluated.

The spontaneous motility in the mouse was evaluated by using groups of five mice treated with various doses, which mice were put in a cage having a floor made of steel bars through which very low voltage current was passed. In moving, the animals caused the closure of circuits with the paws and said movements were quantized, surveyed and registered by a special printing apparatus.

The motorial coordination was evaluated with the "rota rod" test, which consists in putting mice treated with various doses on a rod of rough plastic material rotating at a speed 12 revolutions per minute. The controls remain on the rod for more than 3 minutes: the activity of the product on the motorial coordination was evaluated considering the time of permanence on the rod.

The action on the conditioned reflexes was evaluated by utilizing the "pole climbing avoidance test": the apparatus is comprised by a soundproof box, the floor of which consists of metal bars connected to an electric stimulator. Moreover, the box contains a clock and a wooden stake, which is attached to the centre of the cover and comes down to 2 cm. from the floor. The stake represents the security area on which the rats may shelter to escape an electric shock. The experimental scheme to which the rats were subjected after introduction into the box was the following: 15 seconds of silence, 15 seconds of acustic stimulus, 30 seconds of associated acustic and electrical stimulus. The response of the animal interrupts this scheme. The animal's mounting on the stake during the period of silence was called $CR_2$ (secondary conditioned response), the mounting during the acustic stimulus was called $CR_1$ (primary conditioned response), and the mounting during the electric stimulation was call UR (unconditioned response). The $CR_2$ was interpreted as anxious response and for this evaluation the test was applied.

Some representative results are reported in the following Table.

in the rat, whereas the psychosedative and neurosedative activities are less important. The neurovegetative activity in the mouse is non-existent. Again in the mouse, the products show a scare miorelaxing activity and do little to influence the spontaneous activity and the motorial coordination. The described properties together with a low toxicity and a non-significant pressor activity (determined by measuring the arterial pressure in the anaesthesized cat), allow that these compounds be defined as drugs having selective-psychoactive character. The administration of the products can be effected orally or parenterally, and said products can be administered alone or in association with suitable pharmaceutical solid or liquid supports.

A very important fact which was evidenced by the tests made on the animals to evaluate the neuropsychic activity of the compounds of the present invention, consists in the observation that said activity becomes higher in the passage from rodents to such animals as cat, dog, monkey. From this fact a very good possibility for using these compounds in man can be foreseen.

I claim:

1. A thioamide of a 4-substituted syringic acid of the formula

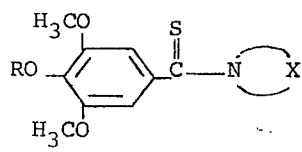

wherein R represents $CH_3—$, $C_2H_5—$, $CH_3CO—$, or $C_2H_5OCO—$, and

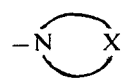

TABLE

| Compound of the Example | Psychosedative activity $ED_{50}$ mg/kg i.p. | Neurosedative activity $ED_{50}$ mg/kg i.p. | Neurovegetative activity $ED_{50}$ mg/kg i.p. | Miorelaxing activity $ED_{50}$ mg/kg i.p. | $DL_{50}$ mouse mg/kg i.p. | Arterial pressor activity $ED_{50}$ mg/kg e.v. | Spontaneous motility $ED_{50}$ mg/kg os | Rota rod $ED_{50}$ mg/kg os | Anxious response $ED_{50}$ mg/kg os i.p. | |
|---|---|---|---|---|---|---|---|---|---|---|
| 1 | 100 | 300 | 1000 | 300 | >1000 | >30 | 165 | 200 | 30 | 20 |
| 3 | 250 | 400 | 1000 | 500 | >1000 | >30 | 600 | 600 | 40 | 25 |
| 4 | 200 | 500 | 400 | 300 | 700 | >30 | 220 | 220 | 35 | 15 |

From the examination of the data of the preceding Table it can be observed that the most important activity of the tested products is the antianxious activity observed by means of the "pole climbing avoidance test"

is selected from the group consisting of

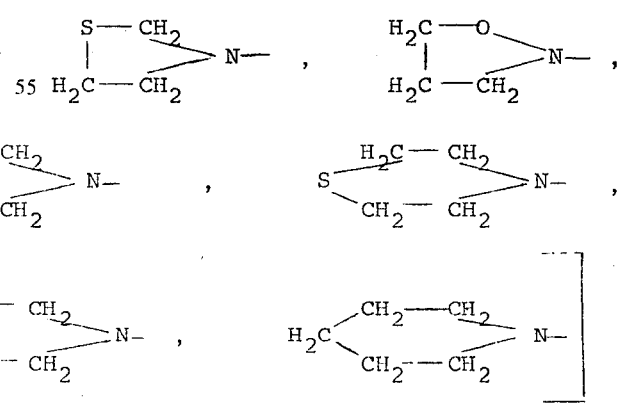

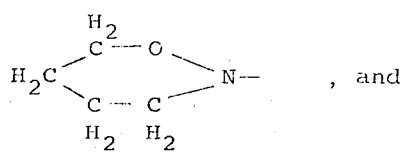 , and 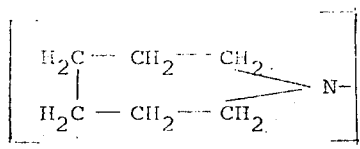
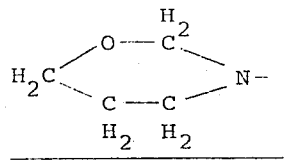
2. Compound of claim 1 comprising 4-(3,4,5-trimethoxythiobenzoyl)-thiamorphaline.
3. Compound of claim 1 comprising 3-(3,4,5-trimethoxythiobenzoyl)-1,3-thiazolidine.
4. Compound of claim 1 comprising 2-(3,4,5-trimethoxythiobenzoyl)-1,2-oxazolidine.
5. Compound of claim 1 comprising 4-(4 acetoxy-3,5-dimethoxythiobenzoyl)-thiamorpholine.
* * * * *

UNITED STATES PATENT AND TRADEMARK OFFICE
CERTIFICATE OF CORRECTION

PATENT NO. : 3,862,138
DATED : January 21, 1975
INVENTOR(S) : GIORGIO PIFFERI

It is certified that error appears in the above-identified patent and that said Letters Patent are hereby corrected as shown below:

Column 4, line 9: replace "form" with -- from --.

Column 6, line 4: replace "scare" with -- scarce --.

Column 6, line 60 et seq.: delete the following:

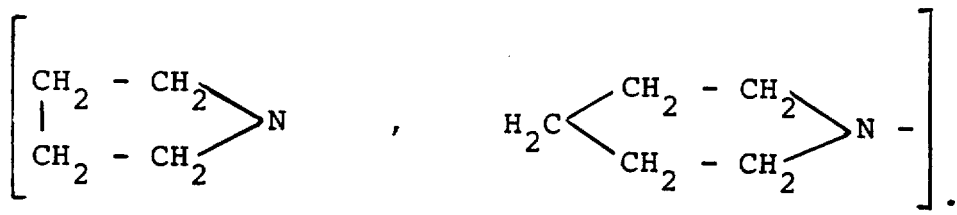

Columns 7 and 8, lines 1 through 14: delete the underscoring of the formulae.

Columns 7 and 8, lines 1 through 14: delete the following:

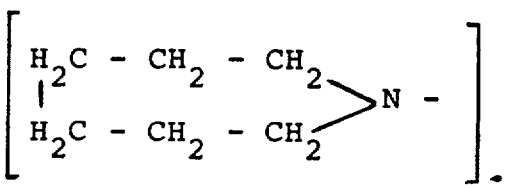

Signed and Sealed this twenty-fifth Day of November 1975

[SEAL]

Attest:

RUTH C. MASON
Attesting Officer

C. MARSHALL DANN
Commissioner of Patents and Trademarks